Sept. 12, 1950
J. C. RICHARDSON
2,522,194
PIPE CONNECTOR
Filed Dec. 14, 1946
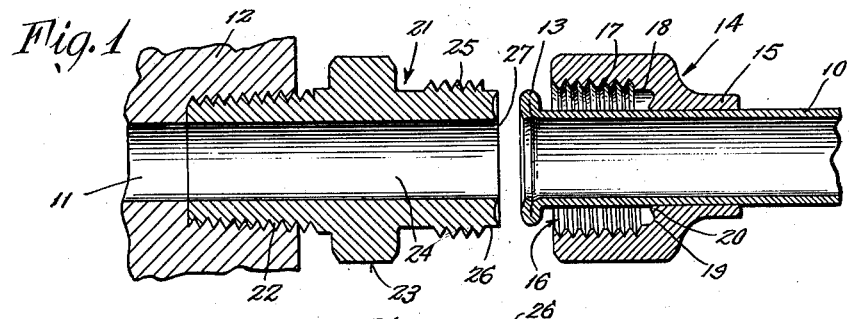
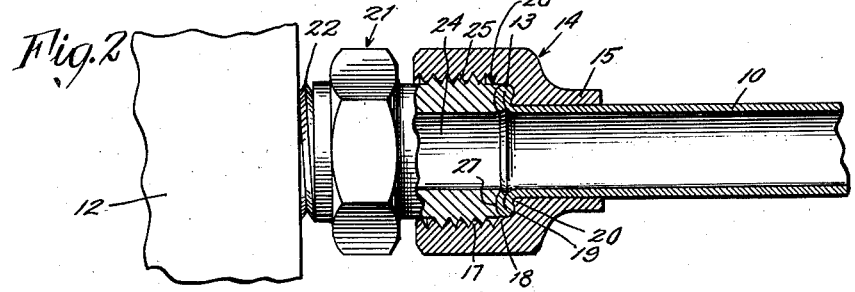
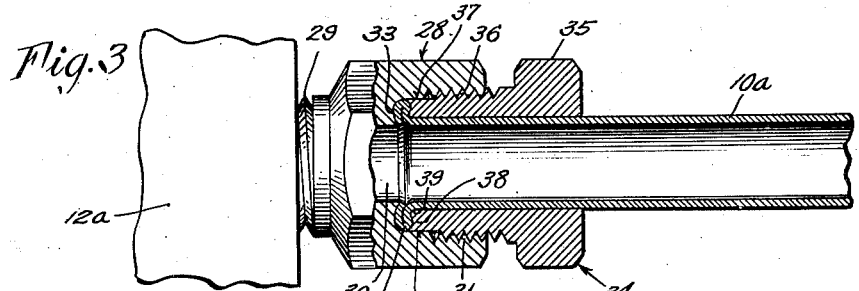
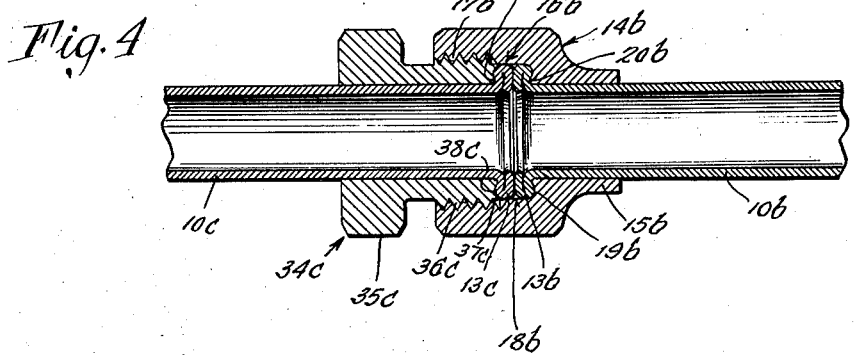
INVENTOR.
James C. Richardson
BY
Johnson, Kline and Hensel
ATTORNEYS Patented Sept. 12, 1950

2,522,194

UNITED STATES PATENT OFFICE 2,522,194

PIPE CONNECTOR

James C. Richardson, Waterbury, Conn., assignor to The Brockway Company, Naugatuck, Conn., a corporation of Connecticut Application December 14, 1946, Serial No. 716,370

3 Claims. (Cl. 285—86)

1

This invention relates to coupling or connecting means for threadless pipe, tubing, conduit and the like, for connecting the same to other or similar structure in such manner as to obtain a leak-tight connection.

The need for convenient and satisfactory means for connecting ductile or bendable threadless pipe or tubing, e. g., of metals, such as aluminum, copper, lead, tin, zinc, iron, and alloys of these metals, as well as of ductile plastic materials, to pipe lines or to orifices of structures such as engines, machines and commercial or household fixtures, has been of long standing; one field of application for such connections lying in the use of bendable threadless pipe for connecting household fixtures, such as gas ranges and washing machines, which are to be semi-permanently installed, to existing pipe lines carrying gas, water and the like.

Numerous proposals have been made in an attempt to satisfy this need. Most of these proposals involved coupling means for gripping portions of the pipe walls, or clamping deformed portions thereof between opposed coupling member surfaces. Many of the couplings heretofore known were subject to disadvantages which impair their utility, or render their use unduly expensive or inconvenient. For example, in installations in which the coupling is subjected to axial or lateral stress, or to vibration, the connection tends to fail by gradual deformation of the portions of the pipe engaged by the coupling. Parts of the pipe subjected to the clamping or gripping action of the coupling members are often weakened thereby, rendering the pipe easily susceptible to fracture. Some of the coupling means form constrictions or widened portions in the passage extending through the coupling, offering resistance to the flow of fluids therethrough; and often junctions of several of the coupling members are exposed to fluids in the pipe, so that special precautions must be taken to avoid corrosion, particularly from electrolytic action when the junction is between dissimilar metals. Some of the couplings hereinbefore proposed require a large number of parts, whereby they are relatively expensive to manufacture, and inconvenient to assemble. Furthermore, unless the coupling parts can be preassembled with the pipe, there is danger of losing one or more of the parts before the coupling is installed, thereby rendering the coupling useless. Most couplings require a relatively large number of threaded parts thereof to make up the connection, constituting a considerable inconvenience, particularly in mass production. Furthermore, constructions heretofore known are often subject to the disadvantage that excessive force applied in making up the connection tends to weaken the pipe, while too little force fails to form a sufficiently tight joint.

In accordance with my invention, coupling means are provided for threadless ductile pipe, tubing, conduit or other hollow tubular structures, hereinafter referred to as pipe, wherein only two interchangeable coupling parts are required to secure the pipe in leak-tight engagement with another structure. These parts can be preassembled with the pipe, until used, so that loss of the parts is readily avoided. The coupling is adapted to form a passageway of uniform diameter through the pipe and coupling, offering minimum resistance to the flow of fluids therethrough; and only one junction between metal parts is necessarily exposed to the fluid in the pipe, so that corrosion problems presented by dissimilar metal junctions can be readily overcome. The parts of my coupling are simple in design, and can be readily economically made by mass production methods. The deformed portion of the pipe walls engaged by the coupling members is formed in such a manner as to minimize weakening of the pipe material, and the coupling members are arranged to clamp the pipe in such a manner as to avoid any tendency to weaken the parts of the pipe engaged thereby. In consequence thereof, the force applied in making up the connection is not critical, and the coupling can be tightened with full force to insure a leak-tight connection.

Furthermore, the number of turns required for making up the coupling of my invention can be reduced to a minimum, consistent with the strength of the coupling members themselves. The coupling of my invention provides positive clamping force in axial direction, and in substantially right angles to the parts of the pipe engaged thereto. Accordingly, the pipe is held in such a manner as to offer maximum resistance to failure of the connection when subjected to vibration, or axial or lateral forces.

In accordance with my invention, I provide on or adjacent the end of the pipe an upset double-thickness flange, formed from the walls of the pipe, and extending substantially in radial direction from the pipe. The upset flange can be made, as disclosed in my copending application, Serial No. 702,026, of October 8, 1946, by subjecting an unconfined short length of the pipe, at or adjacent the end thereof to compression in axial direction, while confining adjacent portions of the pipe against expansion, In accordance with this invention the compressing operation is performed on the end portion of the pipe. The unconfined portion of the pipe when subjected to compression, bulges outward to form a ridge or bead, and the two sides of the latter are then forced together to form a double-thickness substantially radial flange. Since the pipe wall upset by such compression is unconfined the metal of the pipe flexes or flows to form the flange in its most natural manner, thus avoiding substantial thinning, or weakening of the metal. At the base of the flange the metal is somewhat thickened and strengthened under the influence of the compression.

The upset flange is then clamped between a pair of coupling members, including draft means, such as interengaging threaded portions, whereby the coupling members can be forced together in axial direction of the pipe against opposite sides of the upset flange. The flange-engaging surfaces of the two coupling members are of shallow curved shape to conform substantially to the shape of the flange. Moreover the coupling members have telescoping portions adjoining the flange-engaging surfaces cooperating therewith to form an annular chamber enclosing and substantially confining the flange. Thus, when the connection is made up and tightened with great force, the flange cannot become unduly deformed, and consequently weakened, by reason of the fact that the metal thereof is confined against substantial deformation by the walls of said annular space. The walls of said space are preferably constructed so as to diverge slightly in radial direction adjacent the bores of the coupling members, so as to prevent the material enclosed in the annular space from being forced inward toward the axis of the connection. Thus, the force applied in tightening the connection is not critical.

Opposite surfaces of the flange are clamped in leak-tight engagement with the coupling members, and the only joint exposed to the action of fluid within the pipe is that between one of the coupling members and the pipe itself.

Since the upset flange is the only part of the pipe forcibly engaged by the coupling members, and since their action on the flange requires no progressive wedging, the number of turns required to bring threaded coupling members into clamping engagement with the flange, can be reduced to a minimum. The clamping effect, being at right angles to a substantially rectangular flange offers maximum resistance to displacement of the pipe in the coupling, and to loosening by axial or lateral forces or by vibration applied thereto.

The coupling means of my invention is also adapted to provide a leak-tight joint between a pair of ductile pipe ends having similar upset flanges on the ends thereof, said flanges being compressed together in a confining annular space by a pair of coupling members in the same manner as the flange on a single piece of pipe. Such use of the coupling requires no modification thereof, except that both coupling members have bores conforming to the outside diameter of the pipe.

Other features and advantages of my invention will appear from the following description of a number of preferred embodiments of my invention, illustrated in the accompanying drawings, wherein:

Figure 1 is an axial cross-sectional view of the parts of a coupling in accordance with my invention, preassembled in preparation for making up the joint.

Fig. 2 is a side view, partly in axial cross-section, of the coupling of Fig. 1, after the joint is made up.

Fig. 3 is a side view, partly in axial cross-section, of a modification of the coupling shown in Figs. 1 and 2.

Fig. 4 is a view in axial cross-section of a pair of pipe ends connected by the coupling members of my invention.

Referring to Figs. 1 and 2 of the drawings, a piece of ductile pipe 10, to be connected to the mouth of a passage 11, in a structure 12, has double-walled upset flange 13, formed at the end of the pipe. The upset flange can be formed, for example, by the method disclosed in my copending application, Serial No. 702,026, of October 8, 1946, wherein the pipe is gripped by an encircling and confining die along a substantial length thereof, with an end portion of the pipe, of sufficient length to form an upset flange, protruding unconfined from the end of the die. The protruding end of the pipe is then subjected to compression in axial direction, for example, by supporting the end of the pipe against a compression member and forcing the die, together with the pipe enclosed therein, toward the compression member. The walls of the unconfined protruding end portion of the pipe bulge outward to form a bead, and the walls of the bead are then forced together to form a double-walled flange, extending substantially in radial direction from the pipe. To avoid reduction of the internal diameter of the pipe at the base of the upset flange, a mandrel may extend into the pipe from the open end thereof during application of compression thereto.

As shown in the drawing, the upset flange bearing pipe has a female coupling member 14, the exterior of which may be advantageously shaped to engage a wrench, for example, by making its surface hexagonal or square. The coupling member 14 encircles the pipe 10 behind the upset flange 13, and has a sleeve portion 15 at its rear end with a bore conforming substantially to the outside diameter of the pipe. At its forward end, coupling member 14 has an enlarged cavity 16, of sufficient diameter to receive the upset flange 13. The outer portion of the cavity 16 is provided with internal threads 17. Extending inward from the threads 17 the cavity 16 has a substantially cylindrical wall 18 of the same, or slightly larger diameter, than the flange 13. The cylindrical portion of the cavity terminates at a shoulder 19, which preferably joins the bore of the sleeve 15 at a slightly (i. e. of small radius) rounded corner 20.

The shoulder 19 faces substantially in axial direction, but is made of concave cross-sectional shape, as by forming a shallow annular groove on its surface to make it conform substantially to the rear surface of the upset flange 13. The curvature of said groove preferably merges into the cylindrical portion 18 of the cavity. By reason of the concaved cross-sectional shape of the shoulder 19, the cavity 16 has, in effect, a slightly re-emergent annular portion surrounding the mouth of the bore of the sleeve 15, so that its wall diverges slightly (e. g. by an angle of about ten to twenty degrees) in radial direction from a plane at right angles to the axis of the coupling, adjacent the bore of the coupling member.

The opposite coupling member of Figs. 1 and 2 is a body or fitting 21, having for example, a pipe-threaded portion 22 for engaging a correspondingly threaded orifice in the mouth of the passage 11 of structure 12, and advantageously includes a nut portion 23 of conventional hexagonal or square shape, for engaging a wrench. The body 21 has a bore 24, of a diameter corresponding to the internal diameter of the pipe 10, and preferably of the passage 11.

The opposite projecting end of the body 21 constitutes a male coupling member, adapted to cooperate with the female member 14. Thus, adjacent the projecting end, it is provided with external threads 25 for engaging the internal threads 17 of the member 14. Extending outward from the threads it has a substantially cylindrical portion 26 shaped to fit telescopically into the cylindrical portion 18 of the coupling member 14. The end surface 27 of the body 21 is hollowed out, as shown, to provide a shallow cup-shaped portion for engaging the outer end of the flange 13, and is advantageously made with a shallow annular groove forming a slightly re-emergent end surrounding the bore 24, the shape of surface 27 being similar to the corresponding surface of the shoulder 19 on the opposite coupling member, being thus adapted to fit the end surface of flange 13. The surface 27, like shoulder 19, diverges slightly from a plane at right angles to the axis of the coupling, adjacent the bore 24, so that said surface and shoulder define an annular chamber for enclosing and confining the upset flange 13, the walls of said chamber diverging from each other in radial direction, adjacent the bore of the coupling by an angle of the order of twenty to forty degrees.

When the coupling is made up, the upset flange 13 at the end of pipe 10 is seated against the cup-shaped end 27 of the body 21, and female coupling member 14 is threaded on to the projecting end portion of the body until shoulder 19 at the base of the cavity engages the rear side of the upset flange 13. When the parts are in this position, the cylindrical portion 26 of the body 21 has entered the cylindrical portion 18 of the cavity 16, thus substantially confining the flange 13 within an annular space formed by the end surface 27 of the body 21, and the shoulder 19 at the base of the cavity 16. The walls of said cavity diverge slightly in radial direction, adjacent the bores of said coupling members.

Thus, when the two members are further tightened, the re-emergent portions of shoulder 19 and surface 27 clamp against the opposite sides of the upset flange 13, and tend to force the metal of the latter outward in radial direction so that it will substantially fill the annular space. Since the surfaces of the coupling members forming said annular space conform substantially to the shape of the flange 13, only slight deformation occurs. The inner edge 20 of shoulder 19 is swaged into the flange 13 but does not bite into the material thereof by reason of its rounded shape. Exceedingly great force applied in tightening the connection cannot injure the flange 13, nor the pipe, since the metal thereof is confined within the aforesaid annular space, while the slightly divergent walls of the annular space prevent inward flow of the material of the pipe or flange. Thus, the joint can be tightened to any desired extent without injury to the connection. An exceedingly tight joint can be formed in this way between the contiguous surfaces of the body 21 and flange 13, which effectively prevents leakage between the two. The only junction exposed to fluids within the coupling is that between the body 21 and the flange 13, so that by making or lining the body 21 with the same metal as the pipe 10, electrolytic corrosion can be avoided.

The bore of the body 21 being the same as the internal diameter of the pipe, provides a passage through the coupling of uniform diameter, offering minimum resistance to passage of fluids through the connection. Since the relative movement of member 14 and body 21 from the point at which flange 13 is initially engaged by shoulder 19 and surface 27, to the point at which the joint is fully tightened, is very slight, the extent of the threads 17 and 25 may be reduced as far as consistent with the strength of the material of which the coupling members are made, so that a minimum number of turns is required for making up the connection.

A modification of the connection of Figs. 1 and 2 is illustrated in Fig. 3. Essentially, the difference lies in the reversal of the male and female coupling members. Thus, in the construction of Fig. 3, the female coupling member 28 is provided with a threaded portion 29 on its rear end for engaging corresponding threads in the mouth of a passage in the structure 12a. The member 28 has a bore 30, corresponding in diameter to the internal diameter of the pipe 10a. The external surface of the member 28 is advantageously made hexagonal, or of any other conventional shape to engage a wrench. At its opposite end, the female member 28 has a cavity with internal threads 31, extending inward from its mouth, and a short cylindrical portion 32 extending inwardly from the threads, said cylindrical portion terminating at a shallow concave shoulder 33, similar in shape to the end surface 27 of the body 21 of Figs. 1 and 2, and adapted to engage the end surface of the upset flange 13a at the end of the length of ductile pipe 10a.

A male member 34 is provided, having a bore conforming to the outside diameter of the pipe 10a, and encircling the latter behind flange 13a. The male member 34 has a nut portion 35 and external threads 36 for engaging the threads 31 of female member 28. The forward end of the member 34 has a cylindrical portion 37, adapted to enter and telescopically fit the cylindrical wall 32 at the inner end of the cavity of member 28. The leading end surfaces 38 of coupling member 34 has a shallow concave shape joining the bore of member 34 at a rounded corner 39, and is thus similar in shape to the shoulder 19 of Figs. 1 and 2.

Thus, the shoulder 33 of female member 28, and the end surface 38 of male member 34, are adapted, when the two are threaded together to form an annular space conforming substantially to the shape of the flange 13a, and to confine the same, said space having opposite walls, diverging slightly in radial direction adjacent the bores of said members.

In assembling the coupling of Fig. 3, pipe 10a is inserted into the cavity of female member 28 until it engages the shoulder 33 and male member 34 is then threaded into said cavity until its leading end surface 38 engages the rear side of flange 13a. When the members are in this position, as shown in Fig. 3, the cylindrical portion 37 of member 34 has entered the cylindrical portion 32 adjacent the base of the cavity of member 28 so as to confine the flange 13a within the correspondingly shaped annular space formed by the two members. When the coupling is then tightened, flange 13a is compressed and forced gently outward to fill said annular space, in which it is confined in the same manner as in the coupling shown in Figs. 1 and 2.

Provision of the rounded corner 39 for engaging the rear of the flange 13a, where it joins the pipe, avoids any tendency of member 34 to cut into the pipe, while at the same time clamping the flange in such a manner as to form a leak-tight connection between the flange and the shoulder 33 of member 28. As in the construction of Figs. 1 and 2, the passage through the pipe and member 28 is of uniform diameter, and only a single metal junction is formed between member 28 and flange 13a exposed to the fluids within the coupling.

Fig. 4 illustrates the use of my coupling means for joining a pair of pipe ends, each having upset flanges as provided in the foregoing constructions. Such use of the coupling involves provision of a pair of members, corresponding to female coupling member 14 of Figs. 1 and 2, and male coupling member 34 of Fig. 3. In this form of coupling a pair of ductile pipes 10b and 10c are provided, having upset double-thickness flanges 13b and 13c on the ends thereof, said pipes preferably having the same diameter. The pipe 10b is encircled by a female coupling member 14b substantially similar in every respect to the member 14 described above. Thus, it has a rearwardly extending sleeve 15b, with a bore conforming to the outside diameter of pipe 10b, and cavity 16b, with internal threads 17b, extending inward from its mouth; and a cylindrical portion 18b extending inwardly from threads, and joining a shallow concave shoulder 19b, adapted to fit the rear surface of the flange 13b; said shoulder joining the bore of the sleeve 15 at a rounded corner 29b of small radius.

The pipe 10c is encircled by a male coupling member 34c, having a nut portion 35c, external threads 36c and a cylindrical end portion 37c adapted to enter and fit the cylindrical portion 18b of the cavity 16b in member 14b. The end surface 38c of the member 34c is shaped like the corresponding end of member 34 in Fig. 3, being of cup-shaped, shallow, concave contour and having a slightly re-emergent projection where it joins the bore of member 34c. The corner therefor is likewise rounded, as indicated at 39c.

Thus, when the member 34c is threaded into member 14b, cylindrical portion 37c enters the cylindrical part 18b of cavity 16b, and the end surface 38c of member 34c, and shoulder 19b of member 14b form an annular space corresponding substantially to the external shape of flanges 13b and 13c when the latter are in abutting relation.

In making up the joint, the two members positioned on pipes 10b and 10c behind flanges 13b and 13c, are threaded together, bringing the flanges into abutting relation, and confining them within the annular space formed, as stated above, by the end surface 37c and shoulder 19b of the two coupling members. As the members are tightened, the flanges are compressed together, and at the same time confined within the annular space, the metal thereof being forced gently outward to fill such space, by reason of the radially diverging walls of said annular space. A connection is thus formed, wherein the internal diameter is uniform through the abutting pipes 10b and 10c, as in the case of the preceding constructions, and the force acting on the pipe flanges have no tendency to thin the metal of the flanges thereof.

Variations can be made in the constructions herein illustrated without departing from the scope of my invention. Thus, the outer edge of the end surface of the male coupling member can be narrowed to a feather edge as illustrated, or made with a narrow annular end surface. In each of the illustrated constructions, the double-walled flanges are formed in the preferred manner by upsetting the end portion of the pipe wall. If desired, however, the upset flange may be formed at a point spaced somewhat from the end of the pipe, the pipe end thereby projecting into the bore of the opposite coupling member. This, however, modifies the diameter of the passage through the coupling, and is accordingly used only where variations in the internal diameter are of no consequence.

The flange formed on the end of the pipe provides means whereby the coupling members can be preassembled therewith, so that the parts will not be lost prior to use of the coupling to form a connection. From time to time, the coupling can be dismantled after it has been made up, and then reinstalled without impairing the tightness of the joint formed thereby.

Variations and modifications may be made within the scope of the invention, and portions of the improvements may be used without others.

I claim:

1. A coupling for ductile threadless pipe having an upset double-thickness flange formed from the wall of the pipe and extending radially outward therefrom, comprising a coupling member having a cavity for receiving said upset flange on the pipe, and a concave flange-engaging surface at the bottom of said cavity, a second coupling member having a concave flange-engaging surface formed on a projection arranged to telescope within said cavity to provide an annular flange-enclosing and confining space between said members and having outwardly diverging walls adjacent the base of the flange and a peripheral confining wall adjacent the periphery of the flange so proportioned that when said coupling members are drawn together said surfaces clamp said flange to form a leak-tight connection therewith, while the material of said flange is caused to substantially fill said recess and be compressed therein between said concave flange-engaging surfaces, whereby the approach of said coupling members is limited by the material of said flange filling said recess, and cutting of the flange by said coupling members is prevented.

2. A coupling comprising a length of ductile threadless pipe, having at the end thereof a double-thickness upset flange formed from the walls of the pipe, and extending in radial direction therefrom, a coupling member encircling the pipe behind said flange, and having a shallow concave flange-engaging surface shaped to conform substantially to the rear surface of said flange; a second coupling member having threaded engagement with the first member operative to move said members relatively in axial direction; a bore in said second member coaxial with the bore of the pipe; and a shallow concave flange-engaging surface on said second member shaped to conform substantially to the front surface of said flange, said coupling members having portions adjacent the flange-engaging surfaces thereof in telescopic engagement so as to form with said flange-engaging surfaces a limited annular space for enclosing and confining said flange, said members when threaded together clamping and confining said flange in leaktight engagement therewith.

3. A coupling for ductile threadless pipe having an upset double-thickness flange formed from the wall of the pipe and extending radially outward therefrom, comprising a coupling member having a cavity for receiving said upset flange on the pipe, and a flange-engaging surface at the bottom of said cavity, a second coupling member having a flange-engaging surface formed on a projection arranged to telescope within said cavity, said flange-engaging surfaces forming an annular flange-enclosing and confining space between said members having outwardly diverging walls adjacent the base of the flange and a peripheral confining wall adjacent the periphery of the flange so proportioned that when said coupling members are drawn together said surfaces clamp said flange to form a leaktight connection therewith while the material of said flange is caused to substantially fill said recess and be compressed therein between said flange-engaging surfaces, whereby the approach of said coupling members is limited by the material of said flange filling said recess, and cutting of the flange by said coupling members is prevented.

JAMES C. RICHARDSON.

REFERENCES CITED

The following references are of record in the file of this patent:

UNITED STATES PATENTS

| Number | Name | Date |
| --- | --- | --- |
| 1,484,295 | Bundy | Feb. 19, 1924 |
| 1,707,904 | Dawson | Apr. 2, 1929 |
| 1,804,814 | Schultis | May 12, 1931 |
| 2,131,509 | Goepel et al. | Sept. 27, 1938 |

FOREIGN PATENTS

| Number | Country | Date |
| --- | --- | --- |
| 342,291 | France | of 1904 |